(12) United States Patent
Bentley

(10) Patent No.: US 6,424,661 B1
(45) Date of Patent: Jul. 23, 2002

(54) ADSL WITH RF POTS OVERLAY

(75) Inventor: Ronald Bentley, Santa Rosa, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/104,761

(22) Filed: Jun. 25, 1998

(51) Int. Cl.[7] .................................................. H04J 1/00
(52) U.S. Cl. ........................................ 370/482; 370/495
(58) Field of Search ................................ 370/480, 481, 370/482, 485, 486, 487, 488, 489, 490, 493, 494, 495, 496, 497, 468, 476, 285, 538, 914, 399

(56) References Cited

U.S. PATENT DOCUMENTS

| | | | |
|---|---|---|---|
| 5,247,347 A | 9/1993 | Litteral et al. ................. 358/85 |
| 5,408,260 A | 4/1995 | Arnon ............................ 348/6 |
| 5,410,343 A | 4/1995 | Coddington et al. ........... 348/7 |
| 5,559,858 A | 9/1996 | Beveridge ..................... 379/56 |
| 5,592,540 A | 1/1997 | Beveridge ................... 379/184 |
| 5,596,604 A | 1/1997 | Cioffi et al. |
| 5,608,447 A | 3/1997 | Farry et al. .................... 348/7 |
| 5,613,191 A | 3/1997 | Hylton et al. |
| 5,625,404 A | 4/1997 | Grady et al. ................... 348/7 |
| 5,668,802 A | 9/1997 | Chalmers et al. ........... 370/276 |
| 5,682,325 A | 10/1997 | Lightfoot et al. ....... 364/514 C |
| 5,682,419 A | 10/1997 | Grube et al. ................... 379/60 |
| 5,909,445 A | * 6/1999 | Schneider ................... 370/468 |
| 5,982,784 A | * 11/1999 | Bell ............................ 370/485 |
| 6,167,095 A | * 12/2000 | Furukawa et al. .......... 375/285 |

FOREIGN PATENT DOCUMENTS

| EP | 0 740 451 A | 10/1996 |
|---|---|---|
| GB | 2313979 A | 12/1997 |

OTHER PUBLICATIONS

Chow P.S. et al., "A Multi–Drop in–House ADSL Distribution Network", Proceedings of ICC/ Supercomm'94, vol. 1, May 1–5 1994, pp. 456–460.

Fleming S., et al., "ADSL: The On–Ramp to the Information Highway", Telephony, vol. 225, No. 2, Jul. 12, 1993, pp. 20, 24–26.

* cited by examiner

Primary Examiner—Huy D. Vu
Assistant Examiner—Phuongchau Ba Nguyen
(74) Attorney, Agent, or Firm—Jackson Walker L.L.P.; Richard A. Mysliwiec; V. Lawrence Sewell

(57) ABSTRACT

A bidirectional telephony (POTS or ISDN) system utilizes RF technology to move the signalling away from the baseband frequency. The method translates baseband telephony signalling into one or more RF signals over twisted pair copper channels, in conjunction with an ADSL or VDSL signal on the same medium.

25 Claims, 2 Drawing Sheets

Frequency

Frequency

Frequency

Frequency

ADSL WITH RF POTS OVERLAY

BACKGROUND OF THE INVENTION

1. Field of the Invention

This invention relates generally to telephony, telephone equipment, and telecommunications systems, and more specifically to an improved telecommunications method and apparatus enabling the sharing of either or both POTS and ISDN signals with ADSL/VDSL signals on the same twisted pair copper channel medium.

2. Description of the Prior Art

Existing bidirectional telephony places the signalling for POTS (plain old telephone service) and ISDN (integrated services digital network) at baseband frequencies. For example, POTS baseband audio and signalling provides connectivity for conventional telephone services, and typically utilizes frequencies from approximately 0–4 kHz. Alternatively, ISDN channel requirements typically consume the 0–200 kHz frequency range.

ADSL (asymmetrical digital subscriber line) service, on the other hand, may utilize a frequency range of from 25 kHz to 1.1 mHz. Because these frequencies overlap ISDN frequencies (at least over the lower portion of the typical ADSL frequency range), it has been commonly held that one cannot combine ISDN and ADSL signals on the same twisted pair copper channel.

In addition, current telecommunication systems offering ADSL with POTS signals utilize passive audio combiners and splitters, which are physically large and bulky components, as well as being relatively expensive.

VDSL (very high-speed digital subscriber line) service is generally at higher frequencies, and thus avoids the overlap problem with typical ISDN frequencies. However, use of VDSL with POTS would still require the use of POTS splitters and/or passive filters.

SUMMARY OF THE INVENTION

The ADSL with RF POTS overlay of the present invention provides a method and apparatus for bidirectional telephony (i.e., POTS and/or ISDN) and utilizes RF technology to move the POTS or ISDN signalling away from the baseband frequency. The inventive method translates the initially baseband telephony signalling into one or more RF signals over twisted pair copper channels, in conjunction with an ADSL or VDSL signal on the same medium, and enables the flow of high information rate content in both directions.

Several alternative RF signals could be utilized, depending upon the particular application. For example, translation from the baseband frequency to narrow band FM signals may be preferable for many current telephone system installations, due to the superior signal to noise ratio that may be achieved with narrow band FM. Alternatively, other FM, AM, or even digital signalling could be utilized. Use of digital signalling could be particularly attractive in applications where digital equipment (such as existing ISDN equipment) is already in place.

The inventive method improves system performance, increases reliability, and reduces cost. The inventive method also eliminates the need for audio filters, and avoids echo and side tone line problems. In addition to the voice information, some or all of the functionality provided by existing loop current and ringing signals can be incorporated into the system. This provides the opportunity for the elimination of ringing transient problems, as well as for the conservation of electrical power.

DETAILED DESCRIPTION OF A PREFERRED EMBODIMENT

Figure 1:
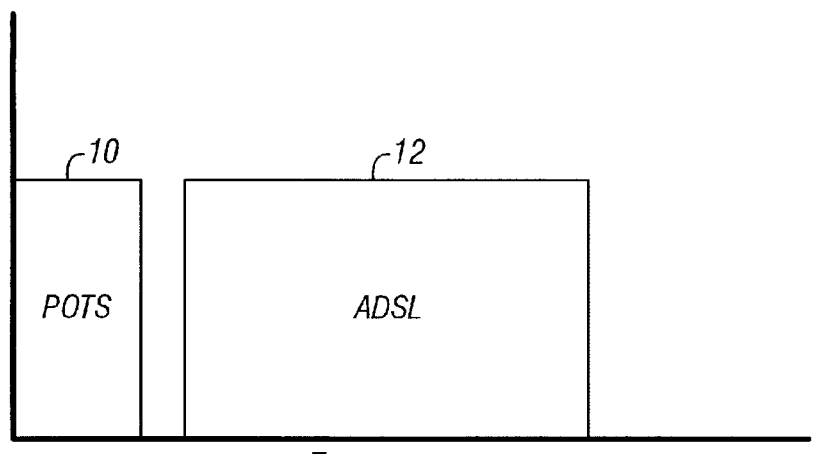
FIG. 1 is a spectrum diagram of a prior art ADSL/POTS overlay.

The telecommunications industry is currently utilizing ADSL (asymmetrical digital subscriber line) signalling with a POTS (plain old telephone service) overlay with a spectral allocation plan such as is shown in FIG. 1 (prior art). Here, POTS service 10 is at baseband frequencies of 0–4 kHz, and ADSL service 12 may be at, e.g., 25 kHz–1.1 mHz.

Figure 2:
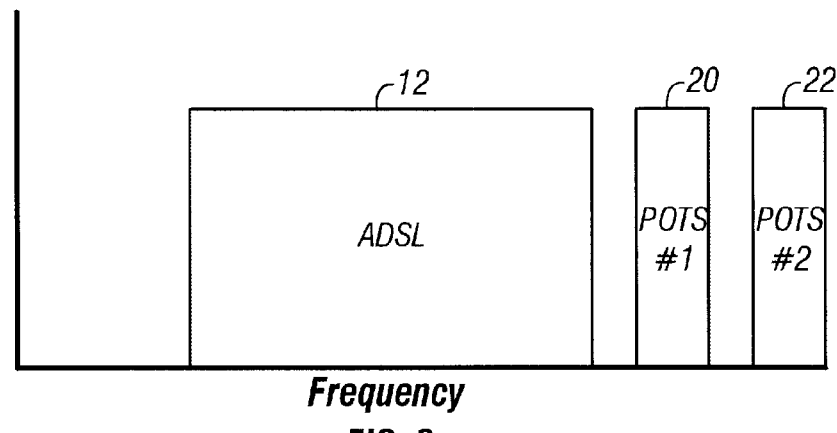
FIG. 2 is a spectrum diagram of an ADSL/POTS overlay of the present invention.

FIG. 2 illustrates the spectrum diagram of an ADSL/POTS overlay of the present invention, which places the central office (CO) to customer premises equipment (CPE) POTS voice information ordinarily carried at baseband frequency on one RF carrier 20, and the CPE to CO POTS voice information on another carrier 22 using a spectral allocation scheme such as is depicted. Which carrier is selected for which traffic direction (i.e., upstream or downstream) may be based upon detailed implementation tradeoffs.

Path loss between the central office and customer premises equipment as a function of frequency, and with different cable types, is a threshold issue. Path loss is less for shorter cables, and for lower frequencies.

The modulation form proposed herein for the POTS voice information is conventional fm (frequency modulation). The highest frequency of the voice information may be on the order of 3 KHz.

The output signal-to-noise ratio of an fm receiver is a function of input signal-to-noise ratio and is a complex function at low input signal-to-noise ratio levels. There is a threshold level at which full fm advantage is seen, and 10 dB is frequently taken as a value for this threshold. Once full fm advantage is obtained, the output signal-to-noise ratio varies linearly with the input signal-to-noise ratio. Under these conditions an excellent place to operate the system is at threshold. If the available signal power results in being on either side of threshold, it would be desirable to vary the modulation index accordingly.

This method of POTS implementation appears promising for Category 5 cable. Preliminary calculations for an fm link shows that with a modulation index of 3 and 0.2 mW of power, an output signal-to-noise ratio of approximately 24.25 dB would be expected. Increasing the power output to 2 mW should result in a 34.5 dB signal-to-noise ratio. This would be at 2 MHz, a relatively high frequency.

With Category 3 cable, at 2 MHz and with a modulation index of 3, approximately 400 mW would be required for a 24.5 dB output signal-to-noise ratio. To increase the output signal-to-noise ratio to 34.5 dB a transmitter power of 4W would be required, which may be excessive.

The path loss versus frequency curve has a slope of approximately 44 dB per MHz. This strongly suggests that if equal signal-to-noise ratios in each direction are desired, then different modulation indices should be employed to equalize the power output requirements. This means that the lower frequency signal will occupy less bandwidth then the upper frequency signal.

It may be desirable to consider the power budget at each terminus when designing the links. If power consumption at the central office is a driving consideration, for instance, then bandwidth may be traded off for power consumption.

Figure 3:
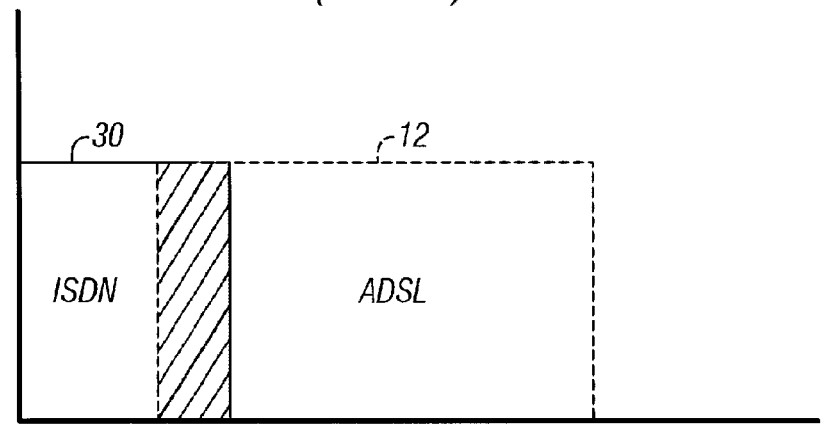
FIG. 3 is a spectrum diagram of a prior art ISDN application.

FIG. 3 is a spectrum diagram of a prior art ISDN service 30. ISDN channel requirements typically consume from 0–200 kHz of loop bandwidth, which overlaps the lower portion of the typical ADSL frequency range 12 as was depicted in FIGS. 1 and 2.

Figure 4:
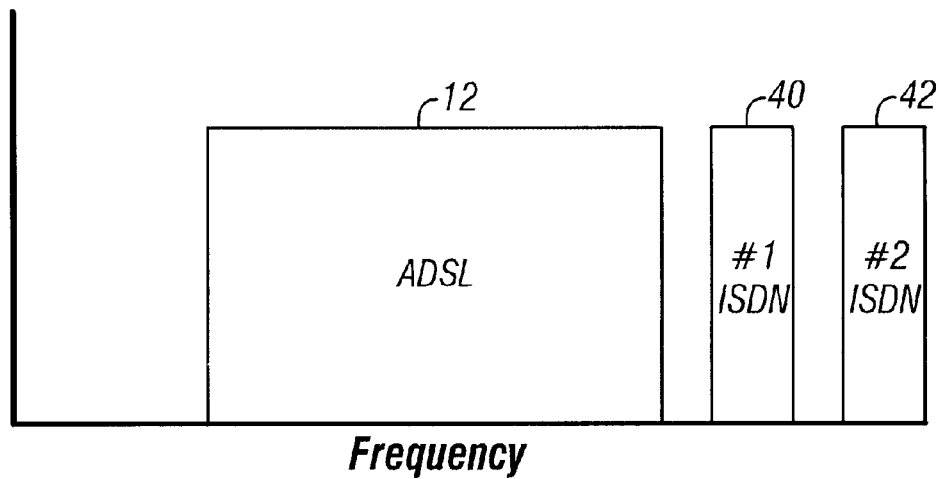
FIG. 4 is a spectrum diagram of an ADSL/ISDN overlay of the present invention.

FIG. 4 is a spectrum diagram of an ADSL/ISDN overlay of the present invention. This illustrates the placement of the ISDN information ordinarily carried at baseband frequency on one or more RF carriers 40, 42 at a frequency above ADSL frequency 12, using a spectral allocation scheme such as is depicted.

Figure 5:
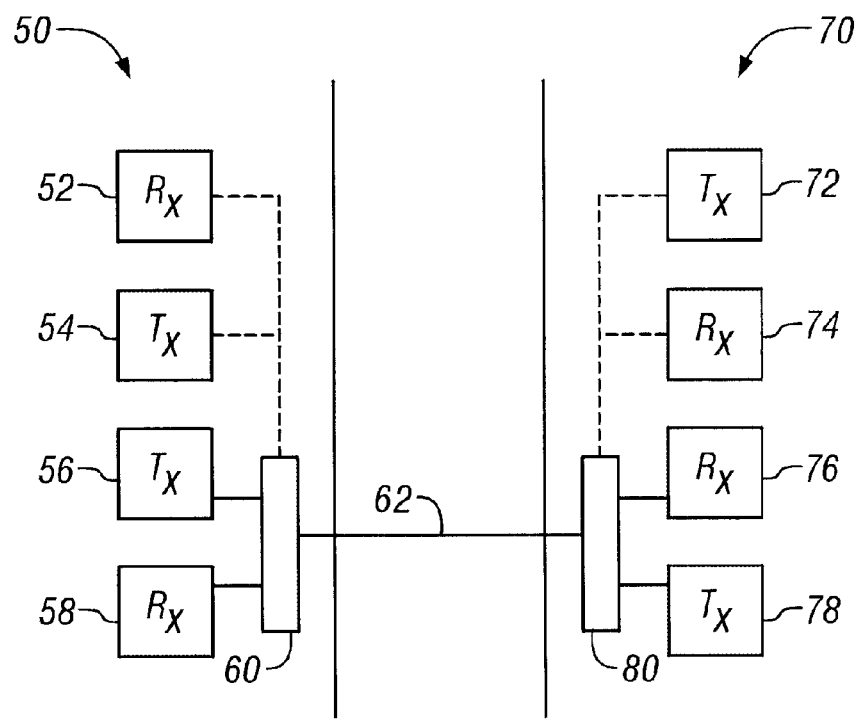
FIG. 5 is a schematic diagram of a telephony system utilizing the RF POTS overlay of this invention.

FIG. 5 is a schematic diagram of a telephony system utilizing the RF POTS overlay of this invention. Central Office Equipment 50 includes POTS upstream receiver 52, POTS downstream transmitter 54, DSL downstream transmitter 56, DSL upstream receiver 58, and combiner (duplexer, diplexer) 60, communicating the combined signals over twisted pair copper channel medium 62 from and to Customer Premises Equipment 70, which correspondingly includes POTS upstream transmitter 72, POTS downstream receiver 74, DSL downstream receiver 76, DSL upstream transmitter 78, and combiner (duplexer, diplexer) 80, all of which components are well known and readily available in the industry.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and their legal equivalents.

What is claimed as invention is:

1. A telecommunications method comprising the steps of:
   providing an ADSL signal on a twisted pair channel medium;
   providing at least one RF subcarrier on the twisted pair channel medium for a POTS signal to enable the flow of high information rate content;
   providing the ADSL signal with a frequency range; and
   providing the at least one RF subcarrier for the POTS signal with a frequency greater than the ADSL signal frequency range.

2. The telecommunications method of claim 1 wherein said step of providing at least one RF subcarrier for a POTS signal comprises providing a first RF subcarrier for an upstream POTS signal and a second RF subcarrier for a downstream POTS signal.

3. The method of claim 1, wherein the twisted pair channel medium is a twisted pair copper channel medium.

4. The method of claim 1, wherein said step of providing the at least one RF subcarrier for the POTS signal includes providing one of an FM signal, an AM signal and a digital signal.

5. A method for bidirectional telephony having both POTS and ADSL signalling, said method comprising the steps of:
   translating the POTS baseband telephony signalling into one or more RF signals; and
   delivering said one or more RF signals over twisted pair channels with said ADSL signalling;
   wherein said ADSL signalling has a frequency range, and the step of translating the POTS baseband telephony signalling comprises translating the signalling into one or more RF signals having a frequency greater than the ADSL signalling frequency range.

6. The method for bidirectional telephony of claim 5 wherein the step of translating the POTS baseband telephony signalling comprises translating the signalling into a first RF signal for upstream communication and a second RF signal for downstream communication.

7. The method of claim 5, wherein the twisted pair channels are twisted pair copper channels.

8. The method of claim 5, wherein said step of translating the POTS baseband telephony signalling includes translating the signalling into one of an FM signal, an AM signal and a digital signal.

9. A telecommunications method comprising the steps of:
   providing an ADSL signal on a twisted pair channel medium; and
   providing at least one RF subcarrier on the twisted pair channel medium for a POTS signal to enable the flow of high information rate content;
   wherein said step of providing at least one RF subcarrier for a POTS signal comprises providing a narrow band fm signal.

10. The method of claim 9, wherein the twisted pair channel medium is a twisted pair copper channel medium.

11. A method for bidirectional telephony having both POTS and ADSL signalling, said method comprising the steps of:
   translating the POTS baseband telephony signalling into one or more RF signals; and
   delivering said one or more RF signals over twisted pair channels with said ADSL signaling;
   wherein the step of translating the POTS baseband telephony signalling comprises translating the signalling into narrow band fm signals.

12. The method of claim 11, wherein the twisted pair channels are twisted pair copper channels.

13. A telecommunications apparatus, comprising:
   a first portion for communication of an ADSL signal in a frequency range;
   a second portion for communication of one of a POTS signal and an ISDN signal on an RF subcarrier having a frequency greater than the ADSL signal frequency range; and
   a third portion coupled to said first and second portions for interfacing said first and second portions with a twisted pair channel medium capable of carrying the ADSL signal and the RF subcarrier.

14. The apparatus of claim 13, wherein said first and second portions respectively include first and second transmitters.

15. The apparatus of claim 14, wherein said first and second portions respectively include first and second receivers.

16. The apparatus of claim 13, wherein said first and second portions respectively include first and second receivers.

17. The apparatus of claim 13, wherein said third portion includes a combiner for combining the ADSL signal and the RF subcarrier on the twisted pair channel medium.

18. The apparatus of claim 13, wherein said third portion includes one of a duplexer and a diplexer.

19. The apparatus of claim 13, wherein the twisted pair channel medium is a twisted pair copper channel medium.

20. A telecommunications method comprising the steps of:

provinding an ADSL signal on a twisted pair channel medium;

providing at least one RF subcarrier on the twisted pair channel medium for an ISDN signal to enable the flow of high information rate content;

providing the ADSL signal with a frequency range; and providing the at least one RF subcarrier for the ISDN signal with a frequency greater than the ADSL signal frequency range.

21. The method of claim 20, wherein the twisted pair channel medium is a twisted pair copper channel medium.

22. The method of claim 20, wherein said step of providing the at least one RF subcarrier for the ISDN signal includes providing one of an FM signal, an AM signal and a digital signal.

23. A method for bidirectional telephony having both ISDN and ADSL signalling, said method comprising the steps of:

translating the ISDN baseband telephony signalling into one or more RF signals; and delivering said one or more RF signals over twisted pair channels with said ADSL signalling;

wherein said ADSL signalling has a frequency range, and the step of translating the ISDN baseband telephony signalling comprises translating the signalling into one or more RF signals having a frequency greater than the ADSL signalling frequency range.

24. The method of claim 23, wherein the twisted pair channels are twisted pair copper channels.

25. The method of claim 23, wherein said step of translating the ISDN baseband telephony signalling includes translating the signalling into one of an FM signal, an AM signal and a digital signal.

* * * * *